United States Patent
Patterson et al.

(10) Patent No.: US 9,390,019 B2
(45) Date of Patent: Jul. 12, 2016

(54) METHOD AND APPARATUS FOR PROVIDING HIGH-PERFORMANCE AND HIGHLY-SCALABLE STORAGE ACCELERATION

(75) Inventors: Martin Patterson, Menlo Park, CA (US); Matthias Oberdorfer, Menlo Park, CA (US)

(73) Assignee: VIOLIN MEMORY INC., Santa Clara, CA (US)

(*) Notice: Subject to any disclaimer, the term of this patent is extended or adjusted under 35 U.S.C. 154(b) by 2124 days.

(21) Appl. No.: 11/365,474

(22) Filed: Feb. 28, 2006

(65) Prior Publication Data

US 2007/0266108 A1    Nov. 15, 2007

(51) Int. Cl.
| | |
|---|---|
| G06F 15/173 | (2006.01) |
| G06F 15/167 | (2006.01) |
| G06F 15/16 | (2006.01) |
| G06F 12/08 | (2006.01) |
| H04L 29/08 | (2006.01) |

(52) U.S. Cl.
CPC .......... *G06F 12/0866* (2013.01); *G06F 12/084* (2013.01); *G06F 12/0813* (2013.01); *G06F 2212/263* (2013.01); *G06F 2212/314* (2013.01); *H04L 67/288* (2013.01); *H04L 67/2819* (2013.01); *H04L 67/2842* (2013.01)

(58) Field of Classification Search
CPC . H04L 67/2819; H04L 67/28; H04L 67/2842; H04L 61/2521; H04L 49/9078; H04L 67/288; H04L 12/66; H04L 49/602; H04L 67/104; G06F 12/082; G06F 12/0802; G06F 12/0817; G06F 12/0862; G06F 12/0866; G06F 12/0888; G06F 12/0895; G06F 2212/311; G06F 2003/0697; G06F 3/0601; G06F 11/073; G06F 11/1064

USPC .......... 709/213, 217, 238, 249, 223
See application file for complete search history.

(56) References Cited

U.S. PATENT DOCUMENTS

| | | | | |
|---|---|---|---|---|
| 6,185,625 | B1* | 2/2001 | Tso et al. | 709/247 |
| 6,253,234 | B1* | 6/2001 | Hunt et al. | 709/213 |
| 6,317,778 | B1* | 11/2001 | Dias et al. | 709/214 |
| 6,341,311 | B1* | 1/2002 | Smith et al. | 709/226 |
| 6,490,615 | B1* | 12/2002 | Dias et al. | 709/219 |
| 6,604,143 | B1 | 8/2003 | Nagar et al. | |
| 6,615,317 | B2* | 9/2003 | Roseborough et al. | 711/129 |

(Continued)

OTHER PUBLICATIONS

International Search Report issued Jul. 2, 2008 in corresponding PCT/US07/04142.

(Continued)

*Primary Examiner* — Farzana Huq
(74) *Attorney, Agent, or Firm* — Brinks Gilson & Lione

(57) ABSTRACT

A method and apparatus of providing high performance and highly scalable storage acceleration includes a cluster node-spanning RAM disk (CRD) interposed in the data path between a storage server and a computer server. The CRD addresses performance problems with applications that need to access large amounts of data and are negatively impacted by the latency of classic disk-based storage systems. It solves this problem by placing the data the application needs into a large (with respect to the server's main memory) RAM-based cache where it can be accessed with extremely low latency, hence improving the performance of the application significantly. The CRD is implemented using a novel architecture which has very significant cost and performance advantages over existing or alternative solutions.

17 Claims, 5 Drawing Sheets

(56) References Cited

U.S. PATENT DOCUMENTS

| | | | |
|---|---|---|---|
| 7,200,679 B2 | 4/2007 | Landfeldt et al. | |
| 7,500,055 B1* | 3/2009 | Oesterreicher et al. | 711/118 |
| 7,565,450 B2* | 7/2009 | Garcia-Luna-Aceves et al. | 709/245 |
| 7,680,742 B1* | 3/2010 | Ackerman et al. | 705/59 |
| 7,941,591 B2* | 5/2011 | Aviles | 711/103 |
| 8,553,542 B1* | 10/2013 | Szabo et al. | 370/230 |
| 2002/0078299 A1* | 6/2002 | Chiou et al. | 711/119 |
| 2002/0116585 A1 | 8/2002 | Scherr | |
| 2002/0198955 A1* | 12/2002 | Waldman et al. | 709/213 |
| 2004/0148279 A1* | 7/2004 | Peleg | 707/3 |
| 2005/0125503 A1* | 6/2005 | Iyengar et al. | 709/213 |
| 2005/0240724 A1* | 10/2005 | Koizumi et al. | 711/113 |
| 2006/0136704 A1* | 6/2006 | Arendt et al. | 713/2 |
| 2006/0155759 A1* | 7/2006 | Ramachandran et al. | 707/103 X |
| 2006/0215682 A1* | 9/2006 | Chikusa et al. | 370/428 |

OTHER PUBLICATIONS

Hutsell, W., "An In-Depth Look at the RamSan-400 Solid State Disk", TMS Texas Memory Systems, Sep. 2005, pp. 1-15.

"Scale Out Server Series", *Rackable Systems,* found at www.rackable.com, undated, 2 pages.

"Solid Data: e-100 Workgroup", *SoliData,* found at http://www.soliddata.com/products/e100/, downloaded Dec. 6, 2005, 1 pg.

"Solid Data SCSI SSDs—Datasheet", *SolidData,* 2005, 2 pages.

* cited by examiner

METHOD AND APPARATUS FOR PROVIDING HIGH-PERFORMANCE AND HIGHLY-SCALABLE STORAGE ACCELERATION

FIELD OF THE INVENTION

The present invention relates to data storage, and more particularly to an architecture and approach for a high performance, highly scaleable storage accelerator for computer networks.

BACKGROUND OF THE INVENTION

In computing architectures that use externally attached storage such as Network Attached Storage (NAS) or Storage Area Networks (SANs), there is a growing mismatch between the increasing speed of compute servers and the ability of these storage systems to deliver data in a timely fashion. This inability for storage systems to keep up with fast compute servers causes applications to stall and overall throughput of the system to plateau or even regress under significant load.

When looking more closely at the root causes of this scalability problem, one common factor is latency of fetching data from a disk drive, in particular the rotation and seek time. While drives can deliver large contiguous amounts of data with an initial latency of 1-5 ms in seek time (moving the drive heads to the correct location on disk) frequent access to non-contiguous data can be of the order of ~40 ms per access. For datasets that involve a lot of randomly accessed data (such as relational databases), the drive seek time becomes a major bottleneck in delivering data in a timely fashion.

Traditional attempts to solve this problem include adding a hierarchy of RAM-based data caches in the data path. This conventional approach is illustrated in FIG. 1. As shown in FIG. 1, when a compute server 110 attempts to access data from storage system 102 via a network 120, there are typically at least three different caches in the overall data path. A hard drive data cache 108 provides about 8 Mbytes of cache, a storage system cache 106 provides between about 128 Mbytes and 16 Gbytes, and a compute server data cache 112 provides between about 100 M and 2 Gbytes (typical lightly loaded system).

While such caches are generally beneficial, certain drawbacks remain. For example, the performance problems mentioned above still occur when the active data set is being accessed randomly or is too large to fit into the caches normally present.

There have been a number of companies that have created caching products which try to attack this problem through custom hardware solutions. Examples of this include RAM-SAN from Texas Memory Systems (http://www.superssd.com/default.asp) and e and n-series products from Solid Data (http://www.soliddata.com/). These products are inadequate because they rely on solid-state disk technology which tends to be both expensive and limited in maximum storage size.

SUMMARY OF THE INVENTION

The present invention is related to providing a high performance, highly scalable and cost-effective storage accelerator. According to one aspect, an additional extremely large and scaleable RAM-based cache is introduced into the storage hierarchy between the Storage Array/NAS Filer and the compute servers. While external caching devices are not new and several established products exist, the architecture and approach of the present invention are unique. In one example, the system architecture is based on a parallel computing cluster design which yields an extraordinarily large scaleable cache at a very attractive price point.

In furtherance of these and other aspects, an apparatus that accelerates an access between a storage server and a client over a network according to the invention includes a plurality of computing elements each having an available portion of system memory, a memory pool being comprised of the combined available system memory of the computing elements, and programs respectively executing on the computing elements that cause the access to be intercepted and determine whether data corresponding to the access should be provided from the memory pool rather than the storage server.

In additional furtherance of these and other aspects, a storage system according to the invention comprises a scaleable RAM-based cache system separate from, and in a network path between, a storage server and a compute server.

In additional furtherance of these and other aspects, a method of accelerating storage access, comprises providing a scaleable RAM-based cache system separate from, and in a network path between, a storage server and a compute server.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such.

Further, the present invention encompasses present and future known equivalents to the known components referred to herein by way of illustration.

In general, the present invention greatly improves storage scalability by introducing an additional extremely large and scaleable RAM-based cache into the storage hierarchy between the Storage Array/NAS Filer and the compute servers.

Figure 2:
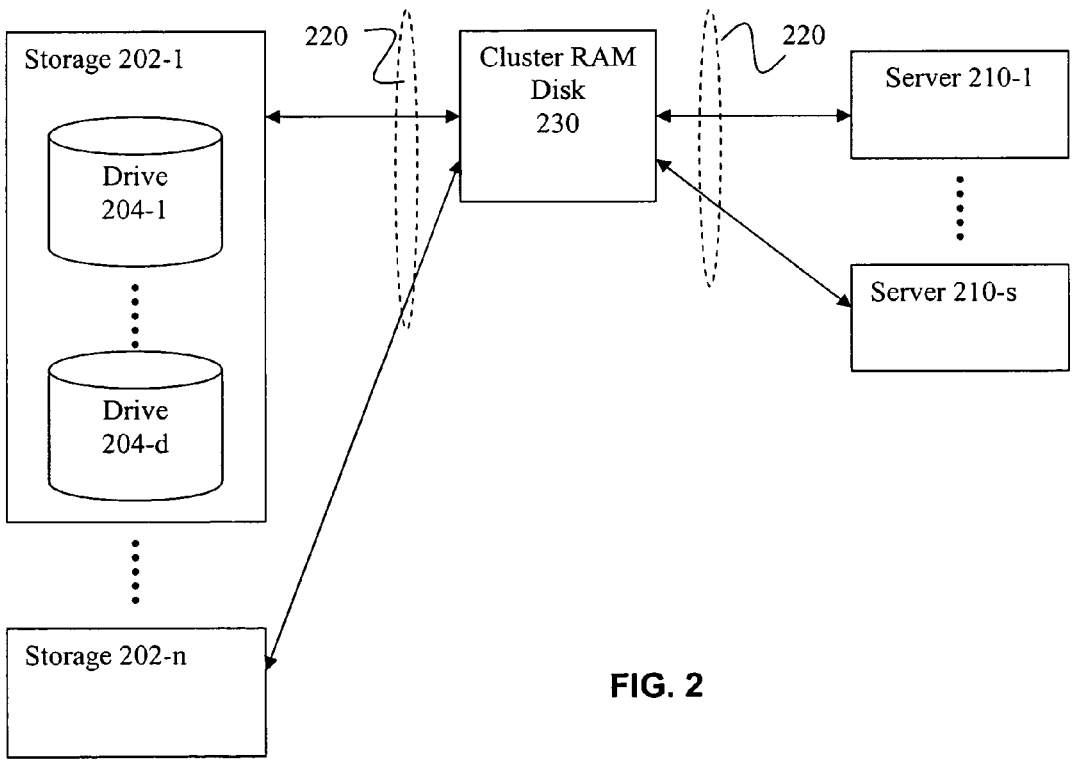
FIG. 2 is a block diagram illustrating an example storage hierarchy in accordance with the invention.

A block diagram illustrating an example architecture in accordance with some aspects of the invention is shown in FIG. 2. As shown in FIG. 2, a cluster RAM disk (CRD) 230 is provided in the data path between one or more storage servers 202-1 to 202-n and one or more compute servers 210-1 to 210-s. The data path is formed by the portion of a network 220 that links the stores and servers. It should be noted, however, that although network elements and protocols can be used to implement the data path, certain of servers 202 and/or servers 210 need not be remotely located from either each other or CRD 230.

Storage servers 202 are in one example NAS filers such as the FAS 900 series from Network Appliance. In another example storage servers 202 are comprised of SAN products such as the Symmetrix DMX series from EMC Corporation. It should be noted that although a plurality of servers are shown, there may only be one. It should be further noted that servers 202 may comprise combinations of different types of servers (e.g. some of both NAS and SAN).

Compute servers 210 are typically high-performance servers running OLTP, batch processing, and other intensive operations under Apple OS X, AIX, Solaris, Linux, and Windows environments, for example. One example of compute servers 210 that can be used include the DL145 from Hewlett Packard.

Network 220 is an Ethernet in a NAS example, or a Fibre Channel in a SAN example. Hardware from Fibre Channel vendors including Cisco, Emulex, Brocade, McData, QLogic, LSI Logic, and Vixel can be used in a Fibre Channel example. Other types of wired and wireless networks and connections, as well as combinations of disparate types of networks, are possible.

CRD 230, as will be described in more detail below, preferably contains a large pool of RAM or other type of semiconductor memory, and contains functionality for recognizing and fulfilling requests for reading and writing data between stores 202 and servers 210.

According to one aspect of the invention illustrated in FIG. 2, a single CRD 230 can be interposed in the data path of many storage servers 202, and so its cache can be effectively be shared between these servers. Conventional designs that rely on cache inside the file server effectively "strand" it. For example, one file server may be completely saturated (with all its cache resources in use) whereas a neighboring file server may be idle with plenty of cache resources. As there is no way to share cache between file servers, performance suffers. Moreover, file server cache memory can be very expensive in large quantities, whereas the same amount of other types of RAM are generally cheaper, and are used in CRD 230 in accordance with one aspect of the invention.

Figure 1:
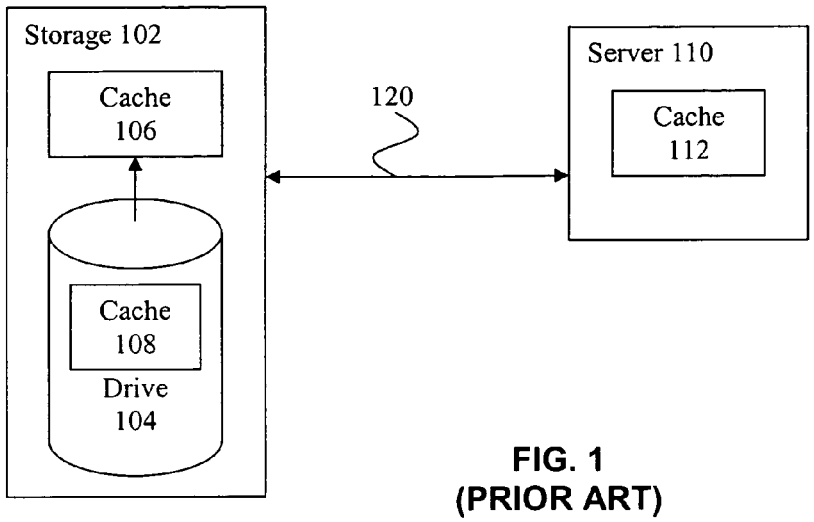
FIG. 1 is a block diagram of a conventional storage hierarchy.
Figure 3:
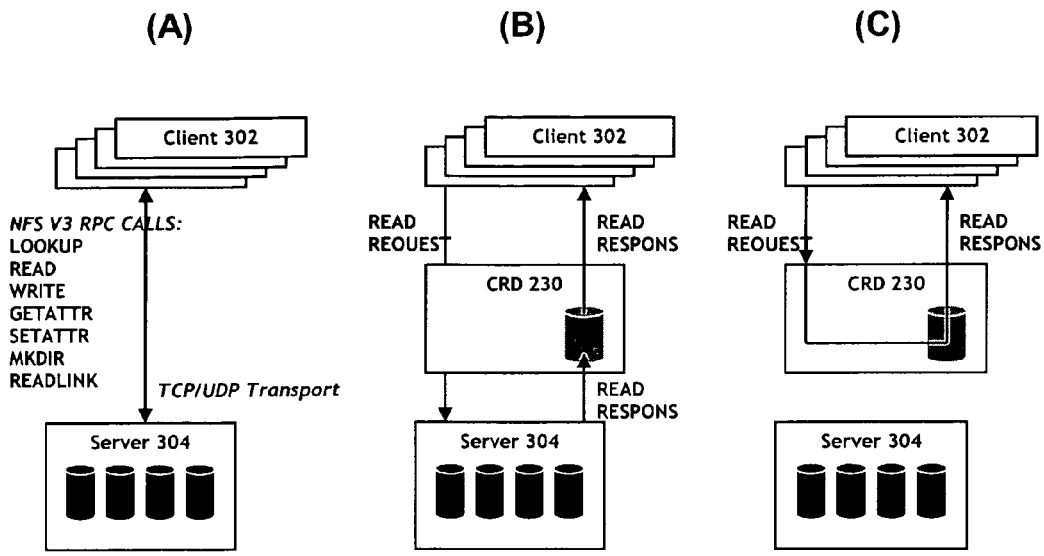
FIGS. 3A to 3C illustrate a high-level read flow.

FIGS. 3A to 3C illustrate the advantages of the invention in connection with a high level read flow. FIG. 3A illustrates a conventional flow where compute servers 210 access data from storage servers 202 using an NFS protocol, servers 210 singly or together implement one or more NFS client processes 302 and servers 202 include one or more NFS server processes 304. NFS is a well-known protocol in the art of network storage. Other protocols that can be used in accordance with the invention include CIFS and Fibre Channel. As shown in FIG. 3A, clients 302 use one or more of the RPC calls found in NFS (e.g. READ) to access data in servers 202 via NFS server process 304. These calls use a direct TCP or UDP connection between NFS client processes 302 and server process 304, as well as the existing caches discussed in connection with FIG. 1.

FIG. 3B illustrates a read flow when CRD 230 according to the invention is provided in the data path between storage servers 202 and compute servers 210. As shown in FIG. 3B, a read request made by NFS client process 302 is intercepted by CRD 230, and the corresponding response data by NFS server process 304 is cached. Accordingly, as shown in FIG. 3C, when a subsequent read request for the same data is made by one of NFS client processes 302, the cached data from CRD 230 can be returned much more quickly than would be possible without CRD 230.

Figure 4:
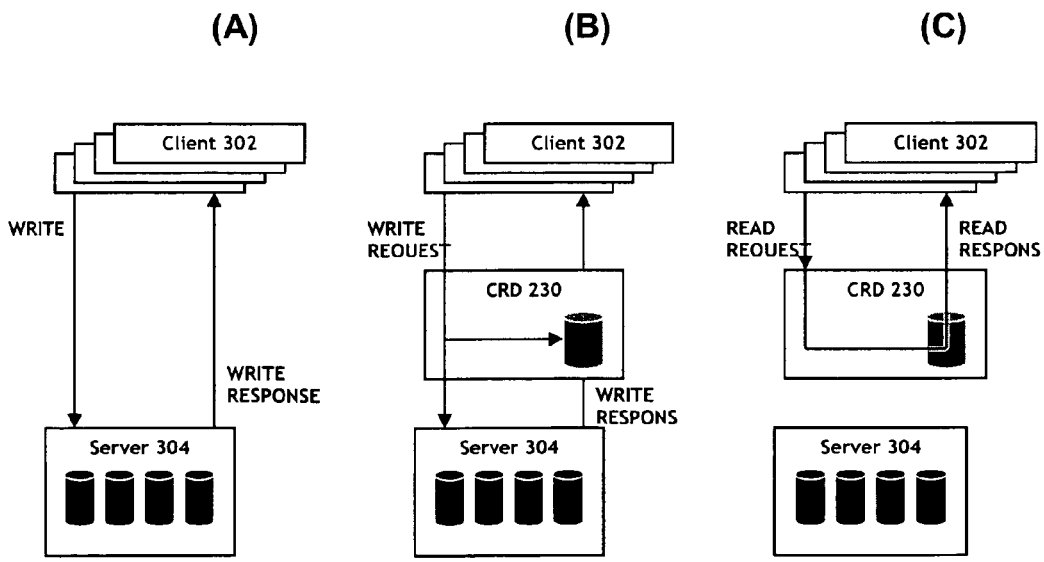
FIGS. 4A to 4C illustrate a high-level write flow.

FIGS. 4A to 4C illustrate the advantages of the invention in connection with a high level write flow. FIG. 4A illustrates a conventional flow where compute servers 210 write data to storage servers 202 using an NFS protocol, wherein clients 302 use one or more of the RPC calls found in NFS (e.g. WRITE) to write data in storage servers 202 via NFS server process 304, as well as a direct TCP or UDP connection between NFS client processes 302 and server process 304 and the existing caches discussed in connection with FIG. 1.

FIG. 4B illustrates a write flow when CRD 230 according to the invention is provided in the data path between storage servers 202 and compute servers 210. As shown in FIG. 4B, a write request made by NFS client process 302 is intercepted by CRD 230, and the corresponding data provided by NFS client process 302 is cached. Accordingly, as shown in FIG. 4C, when a subsequent read request for the same data is made by one of NFS client processes 302, the cached data from CRD 230 can be returned much more quickly than would be possible without CRD 230.

Further details of how a CRD 230 can be implemented to intercept and process read and write flows in various example embodiments will be provided below.

Figure 5:
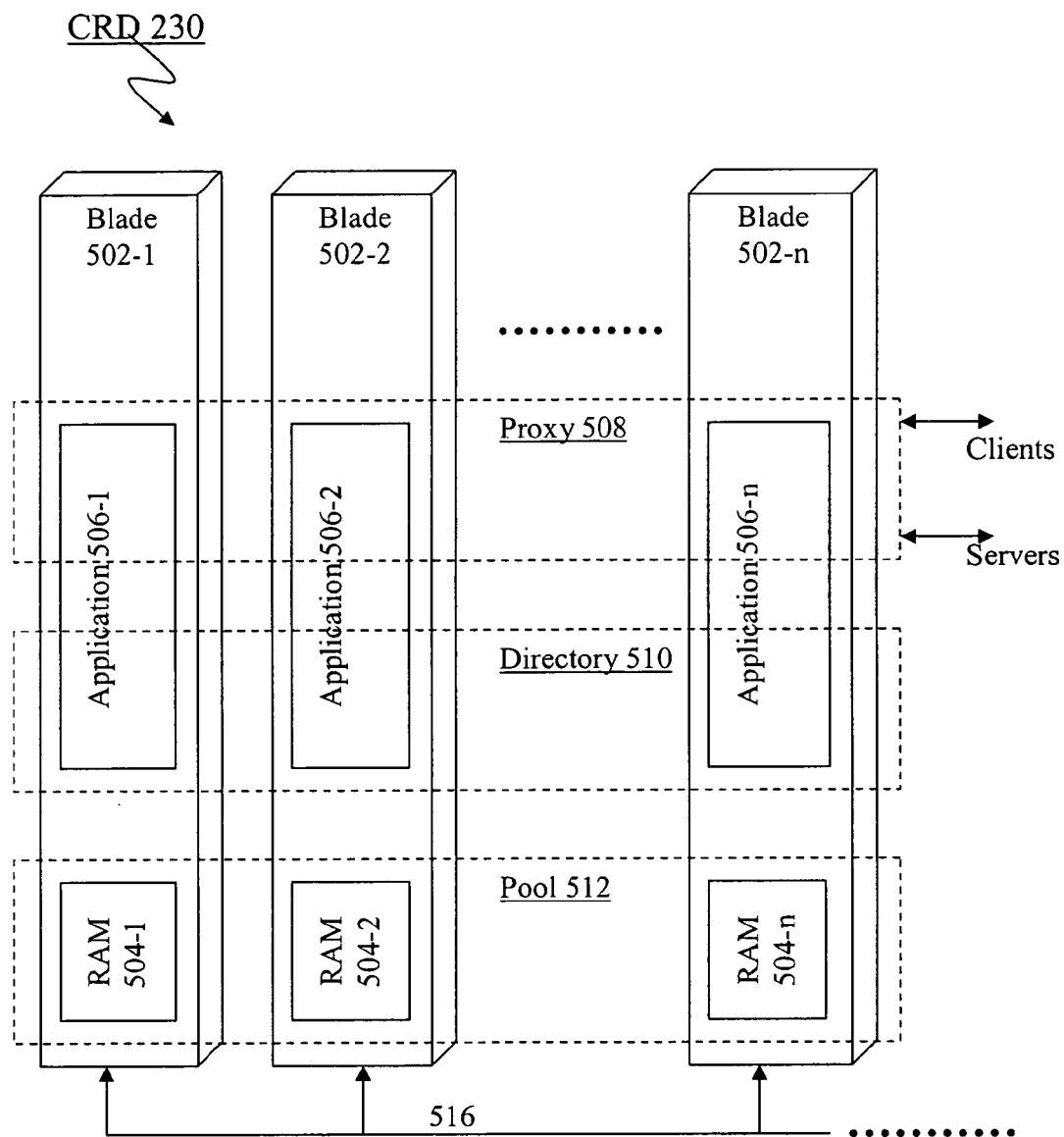
FIG. 5 is a block diagram illustrating an example implementation of a cluster RAM disk according to the invention.

One example implementation of CRD 230 is further illustrated in FIG. 5. As shown in FIG. 5, in this example, CRD 230 is implemented as a cluster of computing elements or blades 502-1 to 502-n. The elements are interconnected using a standard interconnect 516, for example Gigabit Ethernet, which is used to exchange management and control information between blades 502. As shown in FIG. 5, interconnect 516 can further connect the cluster of blades 502-1 to 502-n to additional clusters or blades (not shown), which may or may not be further used to implement CRD 230.

In one example, elements 502 are comprised of 64-bit blade servers such as ScaleOut series blades from Rackable Systems, each having 16 GBytes of system memory (e.g. RAM) 504. The memories of the individual blades are combined together in a manner to be described in more detail below to form a single very large and scalable memory pool 512. According to an aspect of the invention, therefore, the system offers an exceptionally large cache at an attractive price compared to conventional approaches which require expensive custom hardware designs which make the cost of a large cache (>320 GBytes at the time of writing) prohibitive. It should be noted that elements 502 or clusters of elements need not be implemented using exactly the same type of blade server or other computing element, as long as they are capable of supporting an application 506 as described below.

As further shown in FIG. 5, each blade 502 includes a custom application 506 that executes on each respective blade 502 and communicates with other applications 506 via interconnect 516 to thereby preferably implement a proxy 508 and a global directory 510. In one example implementation, the application 506 executes in an embedded Linux or VxWorks environment.

In one example, proxy 508 implements well-known virtual IP addresses and proxy server techniques to intercept and, if possible, fulfill data requests from clients to servers. However, according to an aspect of the invention as will be described in more detail below, the physical blade 502 that handles any given request (or any portion thereof) is determined by a connection handoff mechanism. According to another aspect, proxy 508 includes support for one or more industry standard storage protocols (such as NFS, CIFS, Fibre Channel) and is implemented as a "bump in the wire" tee. Proxy 508 also handles communications from servers back to clients.

Global directory 510 maps the cached files to the physical blade(s) 502 on which they reside. According to an aspect of the invention, a single file can be distributed across multiple blades 502. To be able to locate file content system wide by means of a Global Directory system (i.e. how one blade can determine which other blade has the content it needs to fulfill a particular request), application 506 preferably includes an efficient update mechanism where all blades see a consistent view of the Global Directory, and those skilled in the art will understand various ways to implement such an update mechanism.

Memory pool 512 is comprised of the aggregate of free system memory in RAM 504 of each of blades 502 in one example implementation. According to an aspect of the invention, this allows the total size of the memory pool 512 to be scalable depending on the number of blades 502 that are added or removed from CRD 230, either physically or through any number of software or hardware configuration methods known to those skilled in the art. In this regard, applications 506 preferably communicate with each other to determine the number of blades 502 that are available at any given moment, thus allowing the memory pool to be freely scaled.

As each blade 502 operates as an independent system, one or more of applications 506 further implement algorithms to decide on how best to distribute file content which is too big to fit in a single blade's memory across multiple blades. In one example, the algorithms consider: Placement of file data onto cluster blades based on a static round-robin algorithm, and/or Placement of data onto the next "least loaded blade" with a computed metric of the load factor of each blade. This computed metric can be a combination of one or more of: Total amount of memory in use; Input/Output rate of the blade; Cache activity—how often Cache Reclaim operations are taking place; and other considerations.

In one example, one of blades 502 is designated a default blade for initially intercepting and, if further processing is required, opening a socket in its corresponding application 506 to handle the request. A TCP connection handoff mechanism is then used to allow cloned sockets to be opened by applications 506 in other blades 502 to service a client request for data which it has in its own physical memory.

For example, application 506 in all blades 502 share a single virtual IP address for use of the CRD as a proxy server, and clients 302 are configured to send data requests destined for one of servers 304 to this IP address. The proxy 508 distributed across all blades 502 monitors the requested connection between the specific client 302 and server 304 associated with this connection. When one of blades 502 starts communicating with a client 302 using the virtual IP address, and it is determined that another blade 502 should handle communications (e.g. when the other blade 502 contains data in its physical memory corresponding to a data request from the client), that blade takes over the network connection (e.g. by transparently migrating the connected TCP endpoint from one blade 502 to another blade 502 without interaction on behalf of the client). This allows the other blade to directly deliver its data into the network stream. It should be noted that, in this example, applications 506 may communicate among themselves to determine the default blade at any given point in time.

According to one aspect, CRD 230 also provides for parallel data delivery. This means that many blades can operate in parallel delivering data to clients. An example might be when a single large file is distributed across all the blades in the system, each blade in turn can deliver its portion of the file to clients requesting data. This compares with a single file server where such requests are typically serialized and hence delivered one-by-one.

In some example implementations, application 506 can include a high speed lossless compress/decompress function which doubles or triples the effective size of the memory pool 512 versus the combined size of physically present RAM 504 on the blades. Many compress/decompress functions that are known in the art can be used, such as Lempel-Ziv or Run Length Encoding. Application 506 in other example implementations can further include a high speed checksum function which acts as in integrity check for data going into the memory pool 512 and coming out of it. Application 506 can still further include efficient and scalable file and block level lookup functions.

Further aspects of a CRD as described above and in accordance with the principles of the invention will become apparent from an example read operation illustrated in FIGS. 6A to 6D. In this example, a CRD according to the invention includes four elements 502 designated as blades 0 to 3 and client/server proxy 508 (implemented as a NFS proxy in this example) and global directory 510 allow pool 512 to be used as a large and high-speed cache for data stored by servers 304 and requested by clients 302. In the example of FIGS. 6A to 6D, storage is provided by a NAS server that can be accessed by a client using NFS over a TCP/UDP Ethernet transport. Those skilled in the art will understand alternative applications and environments after being taught by this example.

Figure 6A:
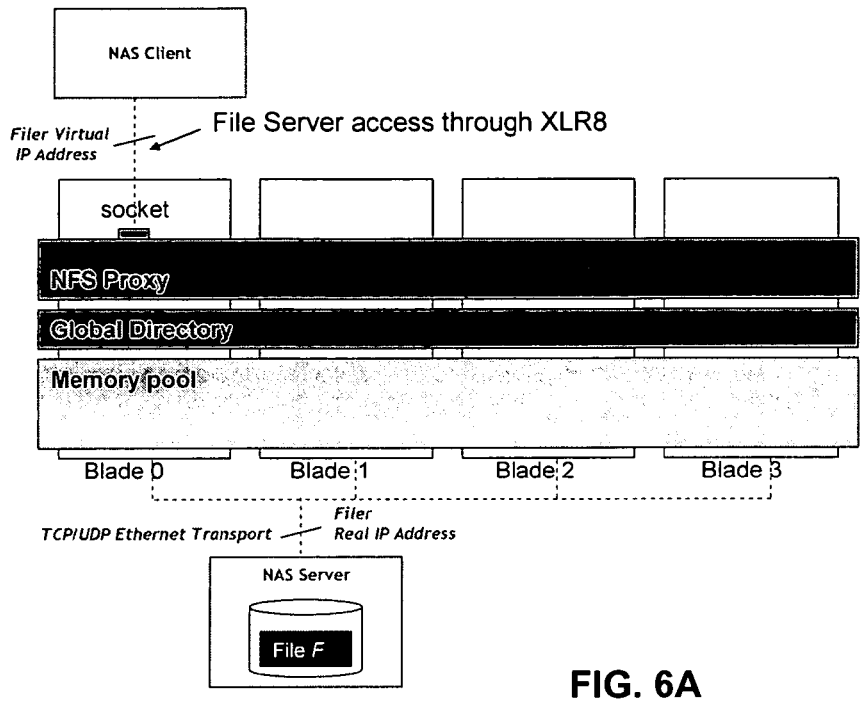
FIGS. 6A to 6D illustrate an example operation of providing storage acceleration by distributing data across multiple computing elements in a cluster RAM disk according to the invention.

As shown in FIG. 6A, a NAS client (executing in a compute server 210 for example) attempts to access File F in a NAS server (executing in a store 202 for example) over a network (e.g. network 220). The request is intercepted by the NFS Proxy which has a virtual IP address that can be shared among blades 0 to 3, and is configured to either process or pass through requests to the real IP address of the NAS server. A socket for handling the request is opened by application 506 in one of the blades 502 of the CRD, designated blade 0, which in one example is configured as an default blade for all requests. If there is no entry for file F in the Global Directory, the request will be forwarded to the NAS server without further processing by the NFS Proxy.

Figure 6B:
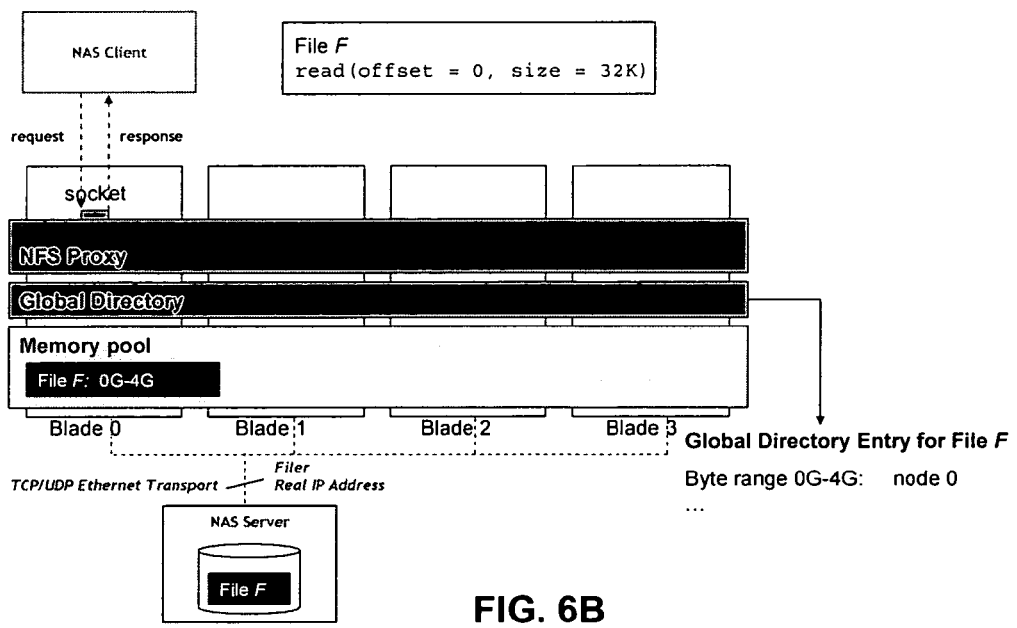

As further shown in FIG. 6B, as the NAS client begins an NFS read operation for file F, data from NAS server is cached in a portion of the CRD Memory Pool that is physically located in blade 0 in addition to being returned to the NAS client via the socket. An entry for file F is created in the Global Directory.

Figure 6C:
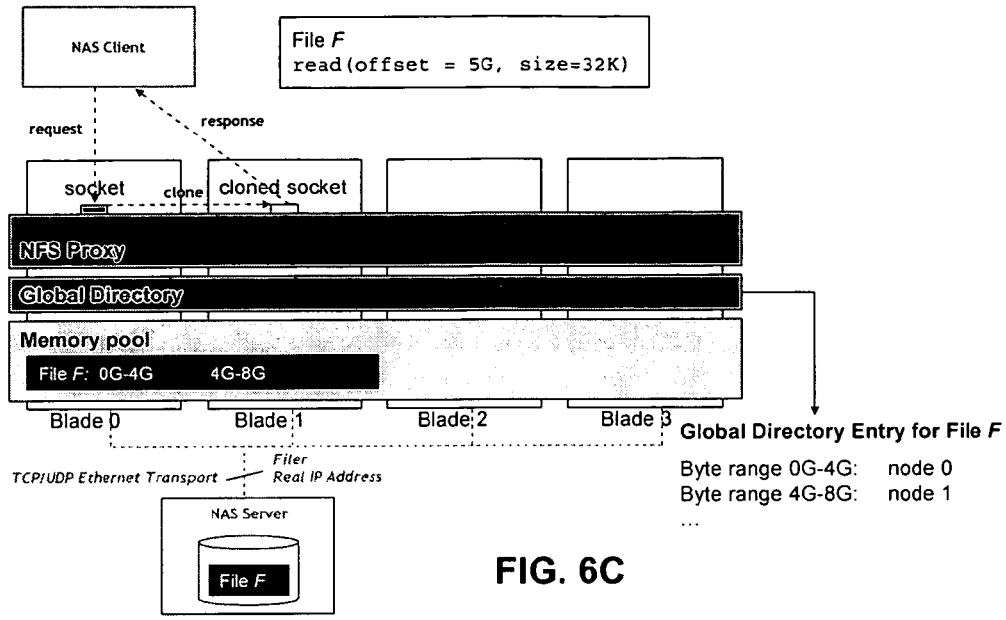

As more file F data is requested by the NAS client in FIG. 6C, the CRD determines that the Memory Pool should be extended to include physical memory in blade 1. Accordingly, the socket is cloned to node 1 and file F data provided by the NAS server is cached in node 1. The connection between the CRD and the client is handed off to blade 1 and the Global Directory is further updated to reflect the range of file F data cached in blade 1.

Figure 6D:
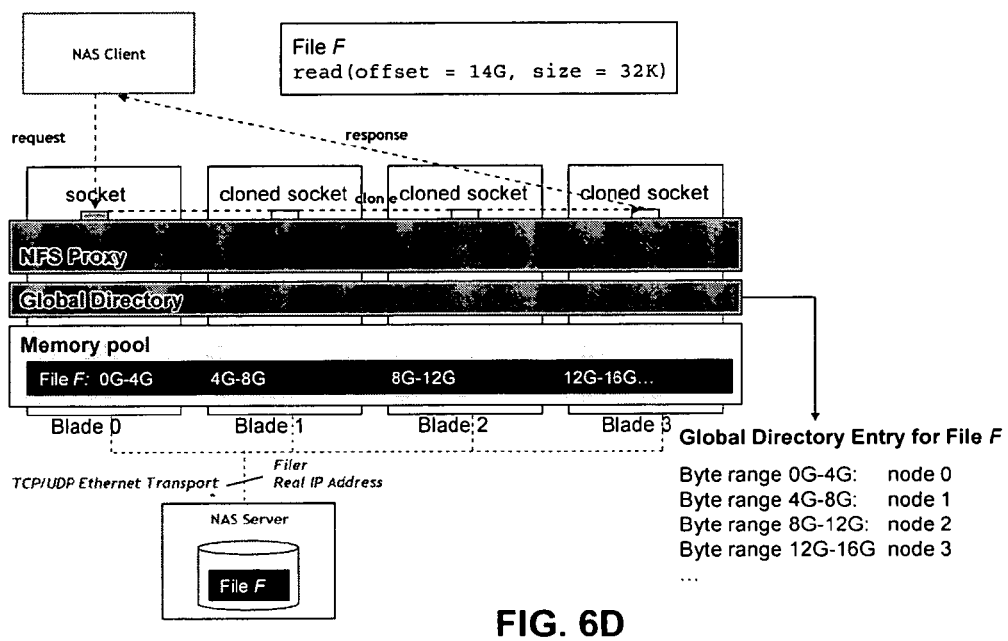

FIG. 6D further illustrates the progression of the Memory Pool extension to physical memory in blades 2 and 3 as more and more file F data is requested by the NAS client and returned by the NAS server. FIG. 6D further illustrates how the Global Directory is correspondingly updated.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A storage system, comprising:
a cache system disposed in a network path between, a storage server and a compute server, the cache system further comprising:
a plurality of cache devices, each cache device comprising:
a processor;
a data memory; and
a network interface,
wherein each cache device of the plurality of cache devices is configured to act as a proxy server to maintain a directory of a location of the cache device of the plurality of cache devices in which a data record is stored; and, one of the plurality of cache devices is designated as a default device to respond to a request from the compute server and to communicate with other cache devices of the plurality of cache devices so that:
responsive to the request for the stored data record, the stored data record is sent directly from the cache device in which the data record is stored to the compute server, providing that the data record of the request is stored in one or more of the plurality of cache devices, and
wherein the cache device intercepting the storage operation request has a network address that is a virtual address of a proxy computer application program operating on the cache system.

2. The system according to claim 1, wherein the plurality of cache devices comprise blade servers.

3. The system according to claim 2, wherein each cached device of the plurality of cache devices includes an available amount of memory for storage of a plurality data records and a memory pool for the cache system is comprised of a total amount of the available amount of memory of the plurality of cache devices.

4. The system according to claim 3, wherein a size of the memory pool is at least 300 GB.

5. The system according to claim 1, wherein the plurality of cache devices are interconnected by a local area network.

6. The system according to claim 5, wherein the network comprises Gigabit Ethernet.

7. The system according to claim 5, wherein the network is an Ethernet.

8. The system according to claim 5, wherein the network uses a TCP (Transmission Control Protocol).

9. The system according to claim 1, wherein the storage operations are in accordance with NFS protocol.

10. The storage system of claim 1, wherein the storage operation requests comprise at least one of read requests or write requests.

11. A method of storage access, comprising:
providing a cache system disposed in a network path between a storage server and a compute server;
wherein the cache system comprises:
a plurality of cache devices, each cache device comprising:
a processor configured to act as a proxy server;
a data memory; and
a network interface,
configuring a cache device of the plurality of cache devices for intercepting storage operations between the compute server and the storage server and maintaining a directory of the cache device of the plurality of cache devices on which data records are stored;
determining the cache device on which a data record of the data records requested by the intercepted storage operation is stored using the directory;
communicating with the determined cache device to cause the requested data record to be sent from the cache device on which the requested data record is stored to the compute server;
sending intercepted storage operations where the data record is not stored in the plurality of cache devices to the storage server, and
wherein the cache device intercepting the storage operation request has a network address that is a virtual address of a proxy computer application program operating on the cache system.

12. The method according to claim 11, wherein the plurality of cache devices comprise blade servers.

13. The method according to claim 11, further comprising:
interconnecting the plurality of cache devices by a local area network.

14. The method according to claim 13, wherein the local area network comprises Gigabit Ethernet.

15. The method according to claim 11, wherein each of the cache devices includes an available amount of system memory, the method further comprising:
forming a memory pool for the cache system from the combined available memory of all of the cache devices.

16. The system according to claim 15, wherein the cache device memory is a semiconductor memory.

17. The method according to claim 11, wherein the network uses a TCP (Transmission Control Protocol).

* * * * *